May 1, 1928.

E. HERDS 1,668,368

STEERING DEVICE FOR MOTOR VEHICLES

Filed Feb. 17, 1926

Inventor
Edvin Herds

Patented May 1, 1928.

1,668,368

UNITED STATES PATENT OFFICE.

EDVIN HERDS, OF NEW YORK, N. Y.

STEERING DEVICE FOR MOTOR VEHICLES.

Application filed February 17, 1926. Serial No. 88,854.

This invention relates to steering devices of motor vehicles and has a special reference to that kind of vehicle having a single front wheel. It has for its objects; first, to simplify the steering mechanism so that it may be manufactured more economically and be more silent in operation; second, to secure greater safety to the occupants of the vehicle; third, to secure easier and more positive steering control than has hitherto been possible in these premises.

In order that the invention may be clearly understood reference is now made to the accompanying drawings which illustrate by the way of example two embodiments of this invention and in which:—

Figure 1:
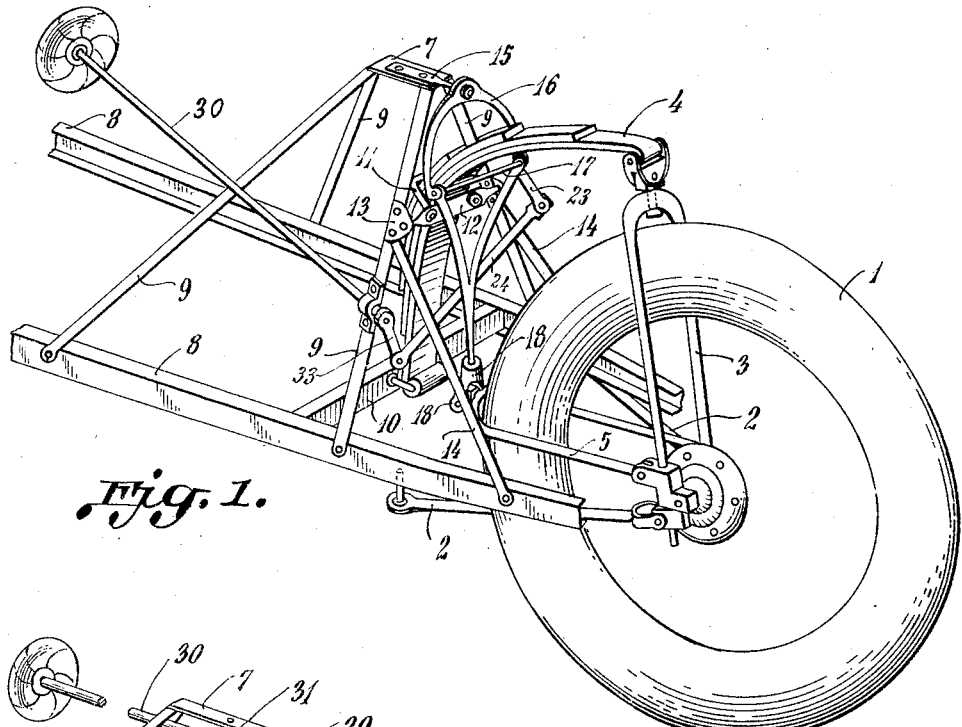
Figure 2:
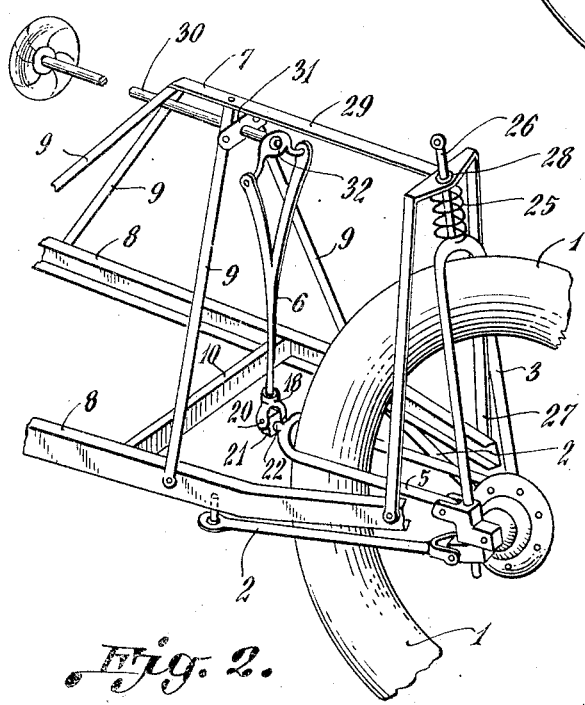

Figure 1 is a side and front view of the front part of the vehicle in perspective. Fig. 2 is a sectional front view of the steering mechanism as taken apart from Fig. 1.

In the front part of the vehicle as seen in Fig. 1 the wheel 1 is laterally held to the side frames of the vehicle by radius rods 2, which have universal connection at their both ends. The vertically inclined wheel fork 3, on which the weight of the front part of the vehicle is suspended, is also connected by a universal joint or the like to the laminated spring suspension member 4, on which it is able to rotate. To turn the wheel for steering purpose a rearward extending fork-like actuating member 5 is fastened with vertically yielding joint to the lower part of wheel fork 3. The rear end of this fork-like actuating member, when moved laterally will guide this wheel in steering.

This invention provides an improved steering mechanism for this wheel arrangement and consists in combination therewith of a novel arrangement of a universally jointed steering member 6 and its actuation by a separate means connected to the front end of steering shaft 30 so that the latter can be disposed laterally to the central median plane of the vehicle and below the upper joint of said steering member.

The reason for the particular construction of the shapes of the upper universal joints will be more apparent if we first observe the general construction of Fig. 1. Behind and above the laminated spring 4, there is a pyramidal structure 7, supported on side frames 8 by four legs 9, these converge together on top, leaving a transverse space for radiator below it. This pyramid is designed to prevent the weaving action of the vehicle frame, which is desirable particularly in the self-stabilizing types of vehicle. Another function of the pyramid for this particular type of construction is to support the spring 4. In this case it is seen that the lower end of the curved spring is held by any convenient spring shackle to the front cross member 10 of the vehicle frame. At the centre it is held by a clip 11 to a spring bearing member 12. This bearing member is able to rock on bearing brackets 13, which are fastened to the front legs 9 of the pyramidal structure 7. Since backward thrust is caused, by the spring, against the legs at this point; they are here braced by stay-members 14, the fore ends of these being riveted to the front part of side frames.

Another function of said pyramidal structure is to support the steering elements and steering member 6, which are separately seen in Fig. 2. On top of said pyramid is a forward projecting pin 15, the rear end of which is flattened and riveted fast on said top. Its forward projecting end fits into a bearing on the centre of a horseshoe shaped universal joint member 16, which is able to rock laterally on said bearing. The lower ends of this horseshoe shaped member have lateral holes through which a pin 17 is passed. Now the upper, fish-tail shaped, end of the steering member 6 is able to rock in longitudinal direction on the pin 17. This is in effect another form of a universal joint and in this case has this form for the reason that the horizontally disposed steering fork 5 should not be lifted too high, while reaching its outer course in steering. It is desirable therefore to bring the upper joint of this steering member 6 higher. The laminated spring should also occupy the central position of the vehicle so that it may hang directly over the wheel fork 3. It is for these reasons that the upper joint of the steering member is above the spring and the universal joint member 16 is so wide that the spring 4 can pass through same without interference in steering.

The lower end of steering member 6 has a yoke shaped body 18 rotatably mounted thereon, a nut 19 is screwed on the tip to prevent said yoke from falling off. Laterally the yoke ends have a pin 20, which holds a centre block 21 within the yoke. This centre block has a hole 22 below said pin and in 90 degree angle with it. Through this hole passes a pin or axis-like projection of the crown end of the fork-like actuating member 5. It will be seen now that the steering member 6 can rotate and bend universally in relation to the rear end of actuating member 5, and said actuating member can do likewise in relation to the lower end of said steering member, thus allowing for the aforementioned curved path taken in steering.

The steering elements such as steering shaft 30, steering arm 33 and drag-link 24 are not new, being well known parts in auto trade. The steering effect transmitted from them can be applied in any suitable manner to move steering member 6 laterally. In this particular case the steering effect is brought to bear on one corner 23 of the horseshoe shaped member 16. This corner is lengthened somewhat and has a perforation on which a ball joint is fastened for a drag-link 24. The forward end of said shaft can be located just as well below on the side frames of the vehicle, but is here preferably fastened to one of the legs of the pyramidal structure.

It will be seen now that turning of the steering shaft 30 will cause the lower end of steering member 6 to move laterally, as it is pivoted on pin 15 above. The bearing on pin 17 will allow forward and backward movement that is required by the curved movement of the rear end of the fork-like actuating member 5.

Within the scope of this invention, aforementioned forms of joint and any other connection that allows universal movement to the opposite ends of steering member 6 of any shape is regarded as universal connection.

Other variations can be made about this invention but the embodiments shown and described are the preferred forms chosen as best illustrative of the main principle, and I do not confine myself to the exact forms except as defined in the claims.

What I claim is—

1. The combination, in a three wheeled motor vehicle, of a single road wheel mounted within a supporting fork, a supporting fork, a vehicle frame, universal connection between the upper part of such fork and the vehicle frame, universal connection between the sides of said wheel and the vehicle frame, a wheel actuating member for the wheel, a steering member connected at opposite ends respectively with the wheel actuating member and with the vehicle frame, a manually controlled member disposed laterally to the central median plane of the vehicle and means operatively connecting the manually controlled member with the steering member.

2. The combination, in a three wheeled motor vehicle, of a single road wheel mounted within a supporting fork, a supporting fork, a vehicle frame, a universal connection with spring element between the upper part of such fork and the vehicle frame, radius rods universally connecting the sides of such wheel with the vehicle frame, a wheel actuating member connected at the sides of the wheel, a steering member connected at opposite ends respectively with the wheel actuating member and with the vehicle frame, a manually controlled member and means operatively connecting the manually controlled member with the steering member.

3. The combination, in a three wheeled motor vehicle, of a single road wheel, mounted within a supporting fork, a supporting fork, a vehicle frame, a spring element with universal joint interposed between and connecting the upper part of such fork and the vehicle frame, a wheel actuating member connected at the wheel hub, a steering member connected at opposite ends respectively with the wheel actuating member and with the vehicle frame, a manually controlled member and means operatively connecting the manually controlled member with the steering member.

4. The combination, in a three wheeled motor vehicle of a single road wheel, a supporting frame mounted at the hub of such wheel, radius rods connecting the sides of such wheel universally to the sides of the vehicle, a wheel actuating member connected at the sides of said wheel, a steering member universally connected at opposite ends respectively with the wheel actuating member and with the vehicle frame, a manually controlled member and means operatively connecting the manually controlled member with the steering member.

5. A combination according to claim 4 in which the connection between the manually controlled member and the steering member is effected by a laterally disposed universally jointed member.

Signed at New York, in the county of New York, and State of New York, this eleventh day of February A. D. 1926.

EDVIN HERDS.